H. D. AULD.
FRUIT JAR OPENER.
APPLICATION FILED MAY 4, 1911.
1,022,574.
Patented Apr. 9, 1912.
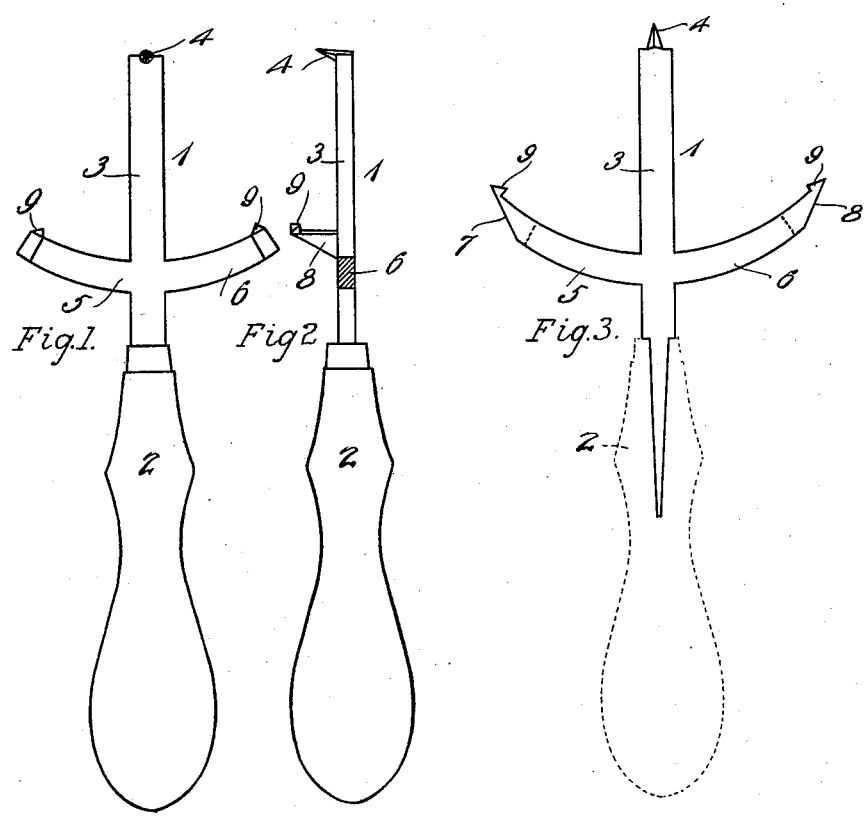
Witnesses.
E. C. Price
Chas N. Burget
Inventor:
Harry D. Auld

UNITED STATES PATENT OFFICE.

HARRY D. AULD, OF THE DALLES, OREGON.

FRUIT-JAR OPENER.

1,022,574.      Specification of Letters Patent.      Patented Apr. 9, 1912.

Application filed May 4, 1911. Serial No. 625,114.

*To all whom it may concern:*

Be it known that I, HARRY D. AULD, a citizen of the United States, residing at The Dalles, in the county of Wasco and State of Oregon, have invented a new and useful Fruit-Jar Opener, of which the following is a specification.

This invention relates to improvements in jar cover removing devices for removing frictionally held caps from jars, glasses and the like.

The object of the invention is to provide a simply constructed, strong and efficient device of this character which will reliably remove jar covers without danger of slipping of the instrument and the consequent injury to the hands of the user.

With these and other objects in view the invention consists of certain novel features of construction and the combination and arrangement of parts as will be more fully described hereinafter and claimed.

In the accompanying drawings: Figure 1 represents a top plan view of a jar top remover constructed in accordance with this invention. Fig. 2 is a side elevation thereof partly in section. Fig. 3 is a bottom plan view with the handle shown in dotted lines.

In the embodiment illustrated the device comprises a one piece metal body 1 with a wooden handle 2 secured thereto. This body member is struck from a heavy piece of sheet metal, preferably steel, in the form shown clearly in Fig. 3 comprising a straight bar 3 having an outwardly inclined lateral spur 4 at one end and with its other end tapered to fit within the handle socket. This bar 3 is provided intermediately of its ends, preferably midway thereof, with oppositely extending curved arms 5 and 6 provided at their free ends with right angular tapered fingers 7 and 8 which extend in the same direction as the spur 4 and have hooks 9 at their terminals for engaging the edge of the jar top to be removed. These arms 5 and 6 are arranged in alinement and in the same plane as the bar 3 forming a transversely arranged segmental member with the fingers 7 and 8 thereof inclined slightly toward the spur carrying end of said bar 3.

In the use of the device the spur 4 is first forced into the cap top and the hooks 9 of the fingers 7 and 8 are engaged with the edge of the glass or jar top and the handle is then elevated to force the top from the jar, the spur forming the fulcrum for the device.

Various changes in form, proportions and the minor details of construction may be resorted to without departing from the principle or sacrificing any of the advantages of the invention as claimed.

I claim as my invention:

1. A jar top remover comprising a body member having a laterally extending obliquely disposed spur at one end, arms extending from opposite sides of said member and having right angularly projecting fingers extending in the same direction as said spur and provided with top-engaging means.

2. A jar top remover comprising a handle and a body portion, the body portion being in the form of a cross with an outwardly inclined laterally extending spur at one end and with its arms curved toward said spur-carrying end, the terminals of said arms having fingers extending at right angles thereto, in the same direction as said spur, said fingers having laterally and forwardly extending lugs at their free ends.

HARRY D. AULD.

Witnesses:
    E. C. PRICE,
    CHAS. N. BURGET.

---

Copies of this patent may be obtained for five cents each, by addressing the "Commissioner of Patents. Washington, D. C."